United States Patent [19]

Dudgeon et al.

[11] 4,307,964

[45] Dec. 29, 1981

[54] SYSTEM FOR MAINTAINING HIGH RESONANCE DURING SONIC AGGLOMERATION

[75] Inventors: James E. Dudgeon; Donald A. Stanley, both of Tuscaloosa, Ala.

[73] Assignee: The United States of America as represented by the Secretary of the Interior, Washington, D.C.

[21] Appl. No.: 238,191

[22] Filed: Feb. 25, 1981

[51] Int. Cl.³ .............................................. B01J 19/10
[52] U.S. Cl. ................................. 366/127; 23/313 R; 55/277; 307/117; 331/155; 364/555
[58] Field of Search ................. 23/313 R; 252/359 R, 252/360; 55/15, 277; 307/117; 331/155; 364/555; 366/127

[56] References Cited

U.S. PATENT DOCUMENTS

| | | | |
|---|---|---|---|
| 2,215,484 | 9/1940 | St. Clair | 55/15 |
| 2,949,166 | 8/1960 | Coleman et al. | 55/277 |
| 3,681,009 | 8/1972 | Horsley | 55/15 X |
| 3,771,286 | 11/1973 | Scott | 55/15 |
| 3,997,433 | 12/1976 | Liu et al. | 209/5 |

OTHER PUBLICATIONS

*Industrial & Engineering Chemistry*, vol. 41, No. 11, pp. 2434–2438, Nov. 1949, "Agglomeration of Smoke, Fog or Dust Particles by Sonic Waves".
*Industrial & Engineering Chemistry*, vol. 41, No. 11, pp. 2439–2442, Nov. 1949, "Industrial Sonic Agglomeration & Collection Systems".

*Primary Examiner*—William A. Cuchlinski, Jr.
*Attorney, Agent, or Firm*—Thomas Zack; Donald A. Gardiner

[57] ABSTRACT

A sonic agglomeration system wherein high sound intensity and resonance are maintained with a low power input. These functions are attained through the use of a chamber feed-horn design that promotes resonance and maximized the efficiency of sound transfer between a sound producing compression driver and a resonant chamber. A digital controller maintains efficient resonance in the chamber and an efficient agglomeration rate constant by making adjustments in the frequency, sound amplitude and nuclei injection rate of the system.

12 Claims, 10 Drawing Figures

SYSTEM FOR MAINTAINING HIGH RESONANCE DURING SONIC AGGLOMERATION

BACKGROUND OF THE INVENTION

1. Field of the Invention

This invention relates to the control of fine particulate by sonic agglomeration and more particularly to a system for maintaining high resonance during the sonic agglomeration of the particulate.

2. Description of the Prior Art

It is known that conventional agglomerators can operate at a power conversion efficiency ($\beta$Na) of approximately 0.03–0.14. These values are the product of sound source efficiency (Na) and the chamber resonance enhancement factor ($\beta$).

These low power conversion efficiency ($\beta$Na) values suggest that:

(1) no resonance exists in the chamber of the system; and (2) poor coupling exists between the sound source and the chamber. Direct radiation from the sound source should produce a higher ($\beta$Na).

The measurement of ($\beta$Na) for the agglomerator disclosed in the patent and publication, respectively, to St. Clair (U.S. Pat. No. 2,215,484 and the publication by St. Clair, H. W., entitled "An Electromagnetic Sound Generator for Producing Intense High Frequency Sound", and appearing in Rev. Sci. Instruments, May, 1941, pages (250–255) shows that while a ($\beta$) of five (5) could be obtained, the efficiency of the St. Clair sound source is so poor that the net ($\beta$Na) is much less than one (1). In addition, the resonant piston sound generator disclosed in this patent is not suitable for scaling up to dimensions required for driving an industrial sized agglomeration chamber.

Chamber resonance is obtained in the St. Clair agglomerator by adjusting the chamber length. The St. Clair agglomerator uses a phase shifting network and analog feedback to maintain the sound source, not the chamber, in resonance. This method of maintaining resonance is inadequate because the frequency is fixed by the length of the sound producing cylinder and cannot be varied. Moreover, the chamber design used by St. Clair is based on a one-dimensional propagating wave analysis.

An attempt was made in the past to develop an agglomerator using as a sound source a whistle which has a cylindrical cavity maintained in resonance by air flowing from a nozzle. It is extremly difficult to maintain resonance with such a sound source because minor changes in air pressure or changes in the position of nearby reflecting surfaces are sufficient to destroy the resonance. This experience provided recognition of the need for a control effective enough to maintain resonance.

Analog control of a treating chamber is disclosed in the patent to Coleman et al (U.S. Pat. No. 2,949,166). An analog signal generator in this patent is controlled by feedback from the chamber. A drawback to this control system is that it cannot distinguish the optimum resonant frequency for the chamber from the many other closely spaced resonant modes that exist within a typical industrial sized agglomeration chamber. If the analog signal generator momentarily falls out of resonance, there is a strong possibility that it will lock onto a non-optimum frequency. Furthermore, in order for the feedback mechanism to remain stable, gain of the analog signal generator must be compromised and it will not achieve the frequency where resonant enhancement of the sound within the chamber is maximized.

SUMMARY OF THE INVENTION

It is an object of this invention to effectively and economically use sonic agglomeration to control fine particulate in an aerosol.

It is another object of this invention to effectively control and maintain resonance of an agglomeration chamber with minimum power consumption.

It is a further object of this invention to provide an agglomeration system capable of adapting in an optimal fashion to changing environmental and aerosol conditions.

In accordance with the foregoing objects of the invention, the apparatus of this invention is for producing high intensity sound pressure levels (hereinafter referred to as SPL) within a fluid-filled chamber and for maintaining a maximum SPL at a minimum consumption of power. The apparatus monitors and controls the major parameters which influence the agglomeration rate constant, namely, (1) sound pressure level, (2) nuclei concentration and injection rate, and (3) flow rates. Nuclei injection of large diameter particles (either artifically produced or fed back from the agglomerator output) can greatly enhance agglomeration. Normal operating conditions are such that when the agglomeration is first started, a fairly large number of nuclei need to be introduced into the chamber to achieve a desired degree of agglomeration. Once the process is started the injection rate can be reduced since the agglomerated particles in the chamber will sustain the process. By monitoring input and output fine particle concentrations, a microcomputer controller can regulate nuclei injection and aerosol flow rates to obtain a desired output fine particle concentration.

The apparatus is able to adapt (e.g., chamber resonance) in an optimal fashion to wide variations in aerosol and environmental conditions (pressure, temperature, humidity, particulate concentration and flow rate changes) and thereby maintain peak performance in an industrial environment by utilizing a microcomputer controller which is capable of simultaneously controlling multiple variables. The apparatus of this invention is highly suitable for sonic agglomeration of fine particle solid suspended in a gas.

The sonic agglomeration process is used to remove fine particles suspended in an aerosol that would probably be missed by standard filtration or cyclone techniques. Fine particles (less than 5 microns) are accelerated back and forth with the gas in a compression-rarefaction cycle. The fine particles collide with larger particles (nuclei), whose movement is not as affected by the sound waves, and attach themselves to the larger particles which have large enough masses to be removed from the aerosol by a large particle collector such as a cyclone. For efficient sonic agglomeration, sound pressure levels greater than 160 db (1 watt/cm$_2$) are used. The process disclosed in this invention is economical because the power consumption of the agglomeration system is low and the system maintains efficient and reliable operation over extremes of environmental and aerosol conditions. For example, if the particle concentration in the aerosol changes, the chamber sound intensity can be changed accordingly. This reduces the power drain on the system amplifier which is responsible for most of the power consumed by the agglomeration system.

The apparatus of this invention has a demonstrated ability to produce a SPL of over 160 db in an eight (8) cubic foot chamber with an input power of 1.5 watts. Large industrial flow rates can be handled by splitting the gas flow between a number of such chambers operating in parallel. With slight modifications, the same apparatus could be used for applications such as treatment of metallurgical wastes, pollution control, separation of gases, foam dispersal, and heat transfer enhancement.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein:

FIG. 3a is a graph illustrating acoustic input resistance to the throat of the horn feeding the agglomeration chamber of the system disclosed in FIG. 1, whereas.

DETAILED DESCRIPTION OF THE PREFERRED EMBODIMENTS

Figure 1:
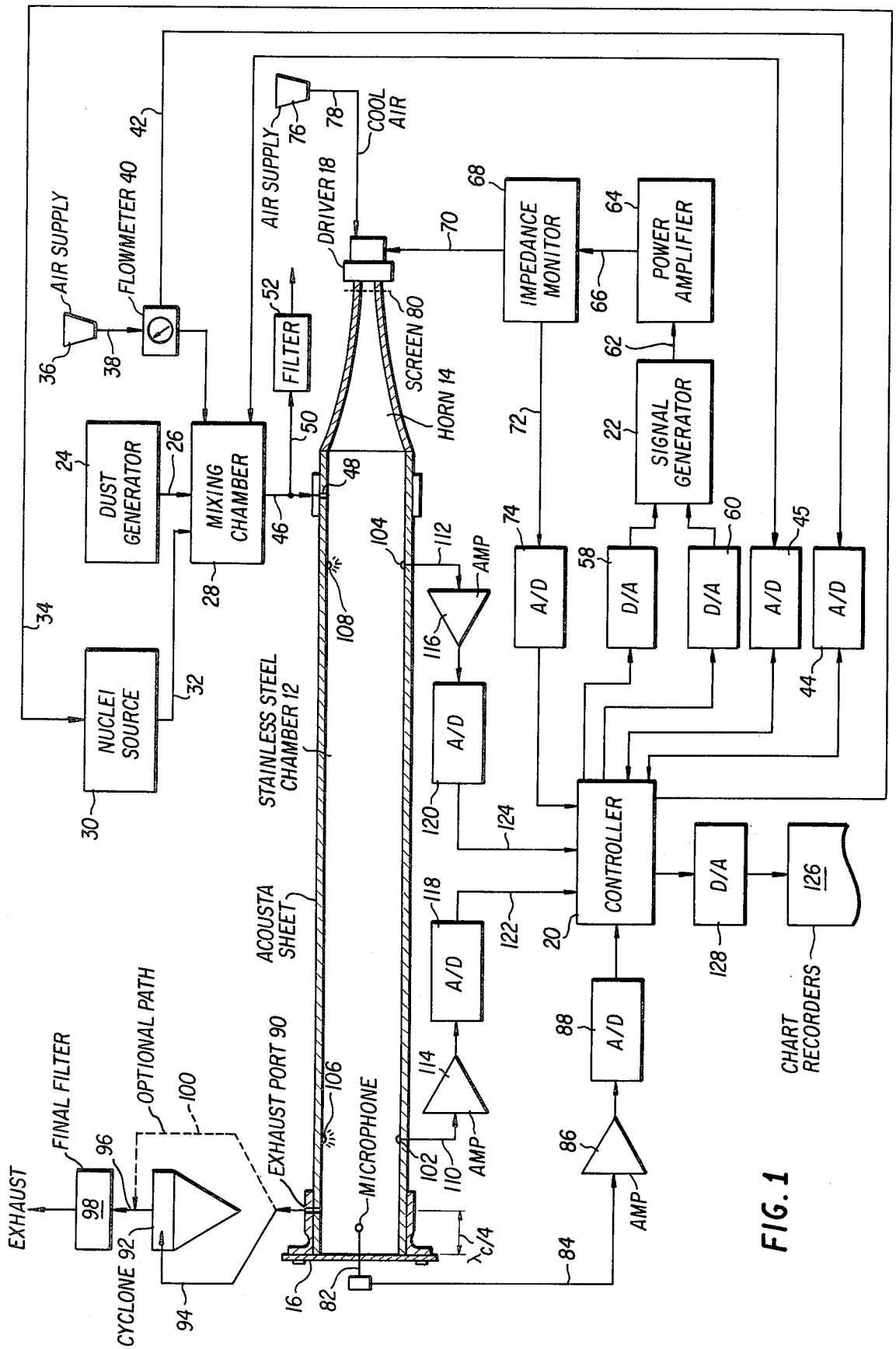
FIG. 1 schematically illustrates the sonic agglomeration system of the present invention.

In FIG. 1, the metal chamber 12 is excited at one end by an exponential horn 14 acting as a sound source and is terminated at the other end with a sound reflecting plate 16. The sound waves within the chamber 12 are resonated so as to obtain a nearly infinite standing wave ratio (peak intensity at an antinode to minimum intensity at a node). If the chamber is in resonance, the sound generator only needs to supply the energy lost in the chamber each cycle. Several of the factors contributing to power losses include impedance mismatches, wall losses, port losses (radiation and impedance), viscous gain losses and thermal effects. The more ideal the chamber and sound source design, the lower the power losses. If the system if not precisely tuned to its resonant frequency, the peak sound pressure level (SPL) obtained in the chamber for a given input power will not be as great.

The cylindrical chamber 12 is mated to the horn 14 which has a circular cross-section and an exponential flare. The agglomeration chamber 12 is of a stainless steel cylinder and for purposes of explanation in this invention is 12 inches in diameter and 10 feet in length. The wall of the chamber is 3/16 inches thick. The other end of the chamber is terminated by a stainless steel plate 16 which is 7/16 of an inch thick. The plate 16 is milled so that it extends about ¼-inch into the chamber 12. In addition, the plate 16 is provided with six (6) equally spaced holes which permit the plate to be bolted to a flange that is welded to the end of the chamber 12.

The wall of the horn 14 is 1-inch thick. The thick end wall of the horn 14 has been tapped and threaded which permits it to be bolted to a flange welded to the stainless steel chamber 12. Rubber gaskets (not shown) are used as seals at both ends of the chamber. The horn is designed to acoustic impedance match the same diameter of the throat of the sound producing compression driver 18 to the large diameter of the cylinder. The flat metal plate 16 at the other end of the cylinder is rigid enough to be a good reflector of sound waves. In addition, the plate can be removed for cleaning the chamber.

For a given aerosol flow rate, the length of the chamber 12 determines the dwell time in the chamber for particles to be agglomerated. Agglomeration rate constant predictions are such that a dwell time of at least eight (8) seconds at a SPL of 160 db typically is needed to agglomerate a high density aerosol. Both chamber diameter and length affect the frequencies where chamber resonances occur. A three dimensional analysis for the propagation of sound waves gives projected resonant frequencies of:

$$f_{rmn} = \frac{c}{2\pi}\sqrt{\Gamma_m^2 + \left(\frac{n\pi}{L}\right)^2}$$

where:

L = effective length of the chamber, a = chamber radius, c = effective velocity of sound within the medium, $\Gamma_m = j_{1m}/a$, $j_{1m} = m^{th}$ root of the Bessel function $J_1(j_{1m}) = 0$, and m,n = integers designating the resonance mode.

Many chambers designs in the past have not achieved good resonant enhancement because their chamber designs were based on one-dimensional analyses or experimental measurements of resonances rather than on three-dimensional analysis (e.g., the St. Clair patent and the patent to Horsley (U.S. Pat. No. 3,681,009). The chamber-horn design for this apparatus results from digital computer optimization of chamber and horn parameters, subject to impedance matching and power conversion efficiency considerations.

The power conversion efficiency ($\beta$Na) for the chamber-sound system is the ratio of the peak sound power within the chamber 12 to the electrical input power to the sound compression driver 18. Ratios as great as 480 have been produced and the larger the value of ($\beta$Na) the greater the efficiency of the process.

Briefly, the remaining apparatus in the system disclosed in FIG. 1 includes, inter alia, a digital controller 20 for receiving outputs from a plurality of sensors in the system and for outputting control information to control various functions in the system. In addition, a signal generator 22 is provided for sound generation within the agglomeration chamber.

The fine particulate to be agglomerated by the disclosed system originates in dust generator 24. The output 26 from dust generator 24 is to mixing chamber 28. The fine particulate is mixed in chamber 28 with larger particles that originate in nuclei source 30 and enter mixing chamber 28 via input 32. As seen in FIG. 1, nuclei source 30 is under the control of digital controller 20 via input 34. The fine particulate and larger particles are entrained in a flow of air from air source 36 that enters chamber 28 through input 38. The flow rate is monitored by flow meter 40 and the flow rate valve inputs controller 20 through input 42. In addition, the mixing rate of the two different particulates is sensed and this sensed value enters controller 20 through input 43. The monitored analog flow value and mixing rate are converted by analog-to-digital converters 44 and 45, respectively, to digital values before entering digital controller 20.

After entrainment in the air flow, the fine particulate and the large particles are carried through output 46 to the input port 48 of the chamber 12. Output 46 from mixing chamber 28 can also be vented to an alternate chamber (possible during repair) or to the atmosphere through connecting line 50 and filter 52.

The control for signal generator 22 is provided by digital controller 20 via output lines 54 and 56. Before entering signal generator 22, these outputted control signals are converted by digital-to-analog converters 58 and 60, respectively, to analog signals useable by the signal generator 22. Output 62 from signal generator 22 is to power amplifier 64 The amplifier signal from amplifier 64 is on output 66 which enters impedance monitor 68 before entering sound compression driver 18 via input 70. The impedance monitor 68 monitors the input impedance 70 to the sound driver 18 and the monitored output 72 is converted by analog-to-digital converter 74 to a digital signal which inputs digital controller 20.

The air supply for sound compression driver 18 is provided by air supply 76 over output 78. As seen in FIG. 1, a screen 80, made from a combined elastic sheet and gasket, is placed between horn 14 and the throat of the compression driver 18 to keep any contaminants in the aerosol from reaching the driver 18.

At the other end of the chamber 12, a microphone 82 extends into the chamber through the center of end plate 16. The microphone 82 is mounted in end plate 16 for movement along the axis of the agglomerator. The microphone 82 produces electrical impulses which correspond to sound waves detected in the chamber 12. The electrical impulses on output 84 are amplified by amplifier 86 before being converted to digital form by analog-to-digital converter 88 for use by digital controller 20.

The exhaust port 90 from the chamber 12 consists of a series of ⅜ inch holes that ring the end of chamber 12 adjacent end plate 16. The agglomerated particles exit chamber 12 through exhaust port 90 and enter cyclone 92 through input 94. Through the process of centrifugal separation, the agglomerated particles, still entrained in the air flow, are collected in cyclone 92 and the air is vented to the atmosphere as exhaust through output 96 and final filter 98. As seen in FIG. 1, the cyclone 92 can be bypassed and the agglomerated particles can be outputted via optional output path 100 to final filter 98.

In FIG. 1, photocells 102 and 104 are at different locations along the length of chamber 12 and are directly opposite light sources 106 and 108, respectively. The concentration of the particulate, at different locations along the length of the chamber 12, can be detected by photocells 102 and 104. The outputs 110 and 112 from photocells 102 and 104, respectively, are amplified by respective amplifiers 114 and 116 before being converted to digital form by respective analog-to-digital converters 118 and 120. The respective outputs 122 and 124 from analog-to-digital converters 118 and 120 input digital controller 20.

The system recorder from digital controller 20 is disclosed as a chart recorder 126. It should be understood by those of skill in this art that the system recorder could be any apparatus capable of recording information from the system. If the recorder operated from a digital input, the digital-to-analog converter 128 could be eliminated from the system.

Figure 2:
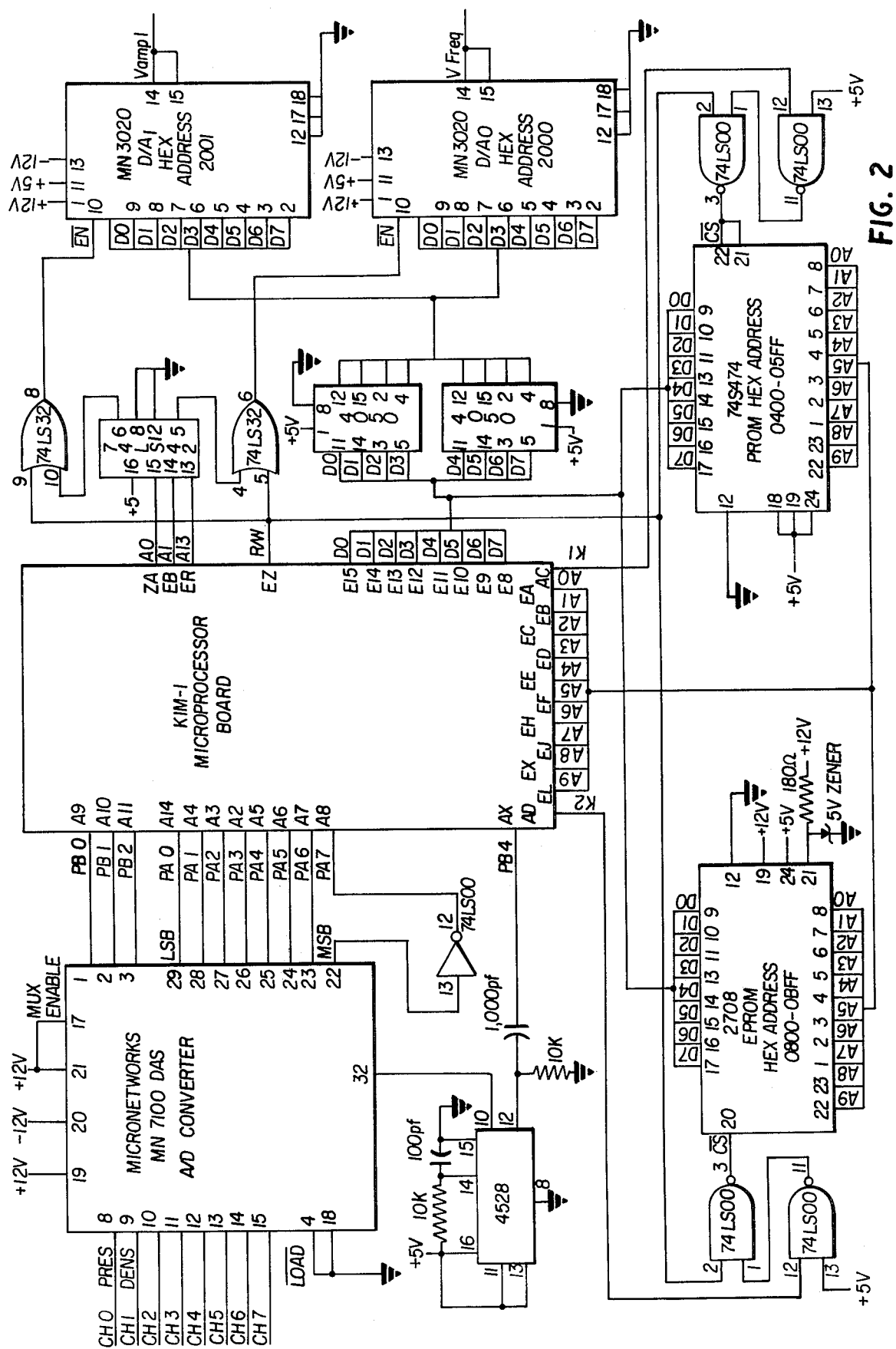
FIG. 2 schematically illustrates the microcomputer electronics utilized in the controller section of the sonic agglomeration system shown in FIG. 1.

In FIG. 2, the microcomputer electronics utilized in the controller 20 of the sonic agglomeration system of FIG. 1 are schematically illustrated. The components available for implementing the functions of the microcomputer are numerous and those disclosed in FIG. 2 should not be considered as being inclusive of components available for use in the microcomputer. The following is a list of components utilized in the microcomputer of the disclosed agglomeration system:

| Manufacturer | Component No. | Quantity |
|---|---|---|
| Commadore | KIM-1 Microprocessor Board | 1 |
| Micro Networks | MN 7100 DAS A/D Converter | 1 |
| Texas Instruments (TI) | 74LS32 | 2 |
| TI | 74LS42 | 1 |
| Micro Networks | MN 3020 D/A Converter | 2 |
| RCA | 4050 | 2 |
| TI | 74LS04 | 1 |
| RCA | 4528 | 1 |
| TI | 74 LS00 | 4 |
| INTEL | 2708 EPROM Memory Chip | 1 |
| TI | 74S474 PROM Memory Chip | 1 |

Figure 3A:
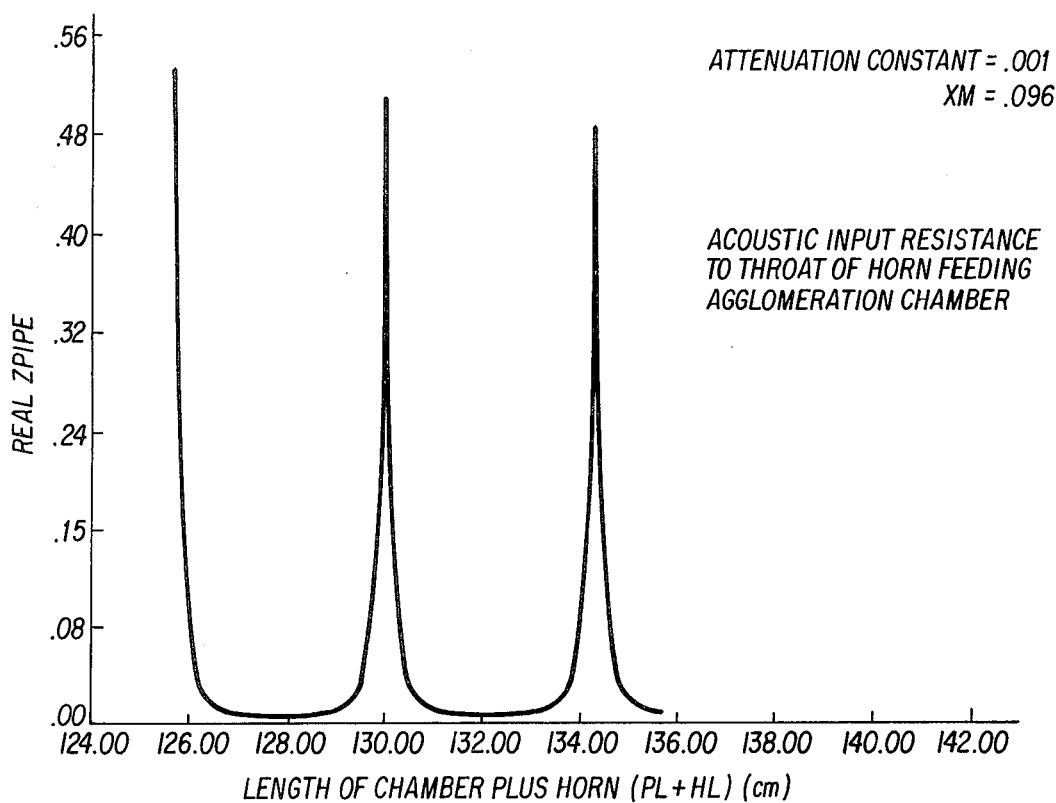
Figure 3B:
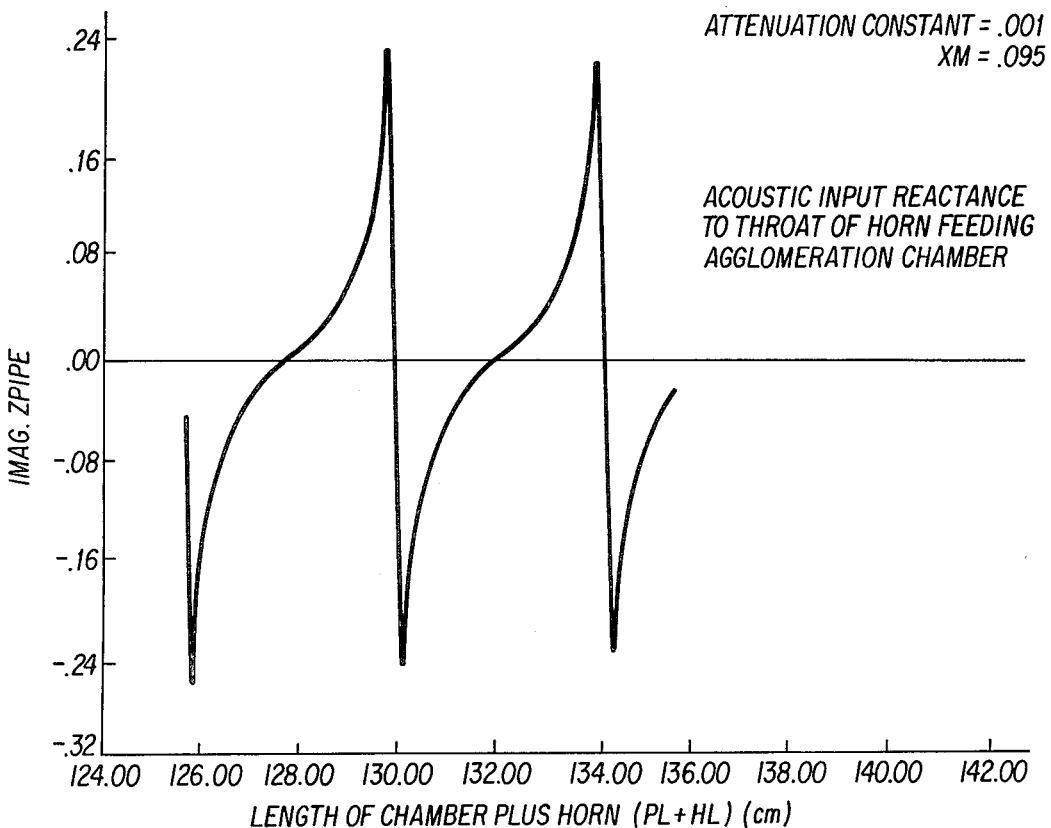
FIG. 3b is a graph illustrating acoustic input reactance to the throat of the horn feeding the agglomeration chamber.

The cylindrical chamber 12 with its capped end forms a complex frequency dependent load for the mouth of the horn section. A digital computer was used to simulate chamber standing wave patterns and the acoustic impedances seen by the compression driver 18 looking into the throat of the horn 14. Horn length, horn flare angle, and excitation frequency were varied, and as seen in FIGS. 3a and 3b, sharp impedance variations occurred near the resonant frequencies of the horn-chamber system. It is noted that: (1) by operating right at the impedance resonant peak, input power to maintain a given chamber SPL can be minimized, and (2) the requirements for the sound signal generator/chamber frequency controller are indeed severe because of the rapid rates of change of acoustic input impedance with frequency that occur near the optimum frequencies. Analog signal generator/controllers, for instance cannot be built to maintain the optimum frequency and be stable. Thus, it can be seen from the graphs in FIGS. 3a and 3b the importance of the digital controller 20 and the signal generator of this invention in maintaining active control over the system. The imaginary component of impedance is plotted versus chamber length in the graphs. The reactance must be maintained at a zero value at the point on the graph where the curve is nearly vertical.

In the controller 20, the acoustic impedance resonance and the chamber resonance properties favor the use of the digital controller described in this invention. Based on the above computer simulation, the horn-chamber parameters maximize chamber SPL while accounting for driver-to-cylindrical chamber impedance matching and horn input acoustic impedance.

Figure 4B:
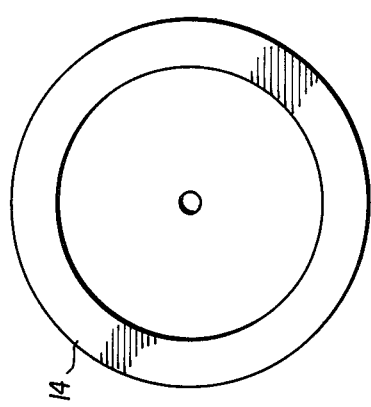
FIGS. 4a and 4b are respectively side and end views, in elevation, of the horn utilized in the system illustrated in FIG. 1.
Figure 4A:
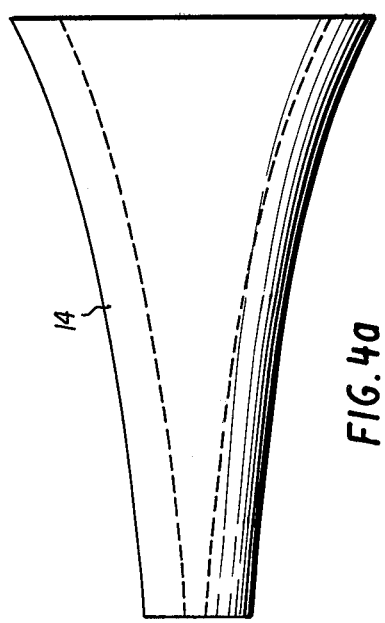
Figure 4C:
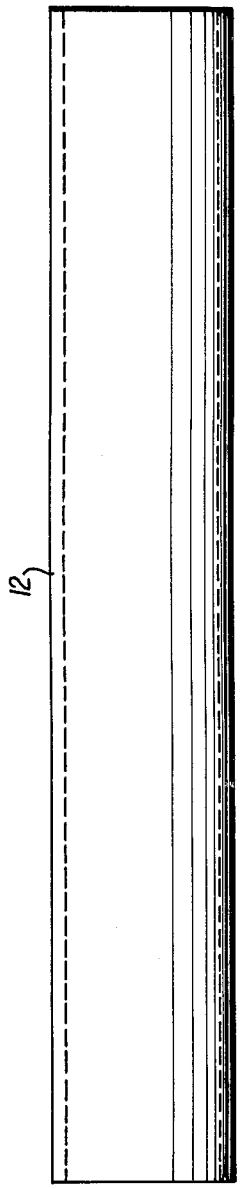
FIG. 4c is a side view, in elevation, of the chamber utilized in FIG. 1.
Figure 5:
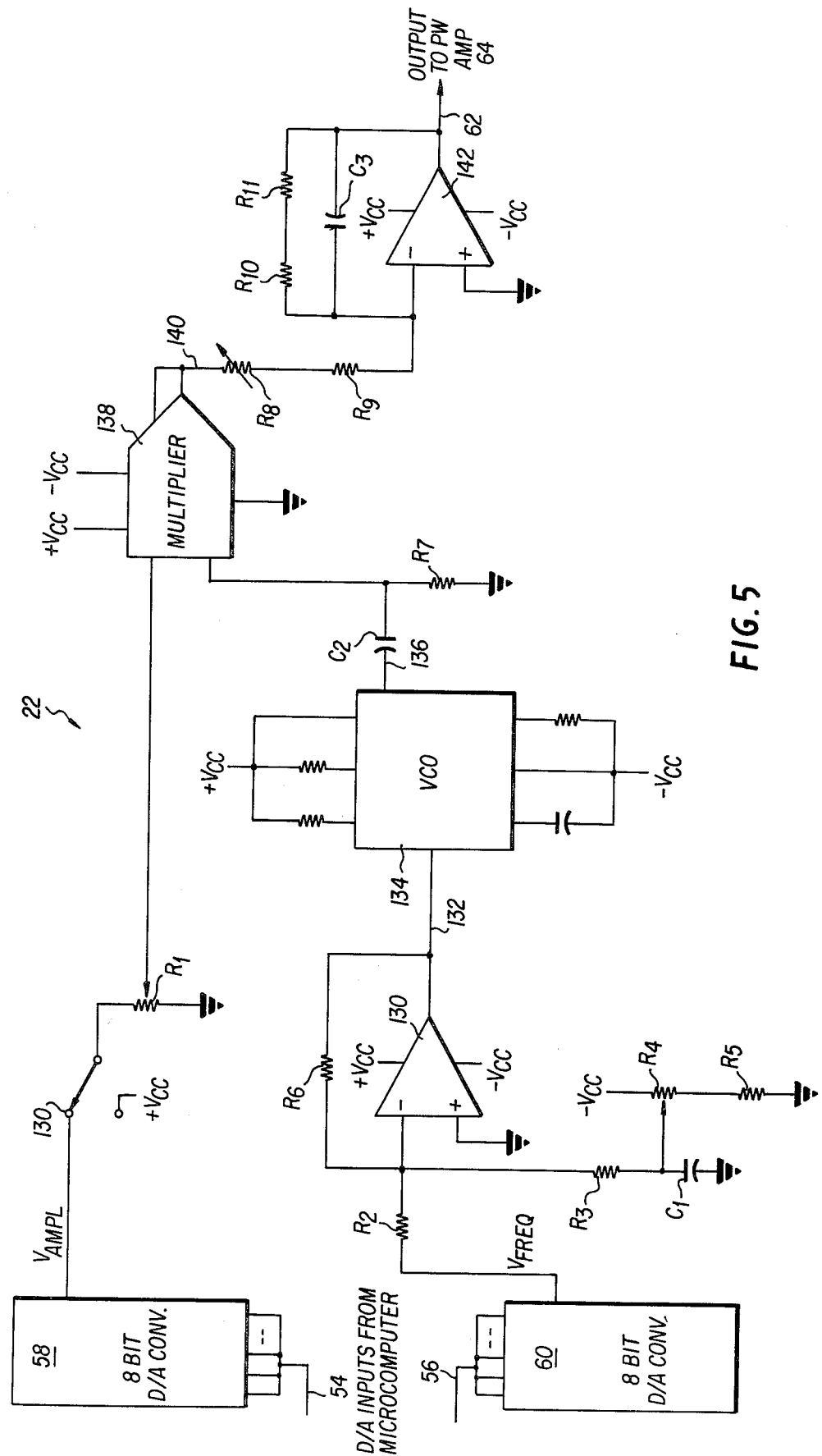
FIG. 5 schematically illustrates the digitally controlled signal generator of the system illustrated in FIG. 1.
Figure 6A:
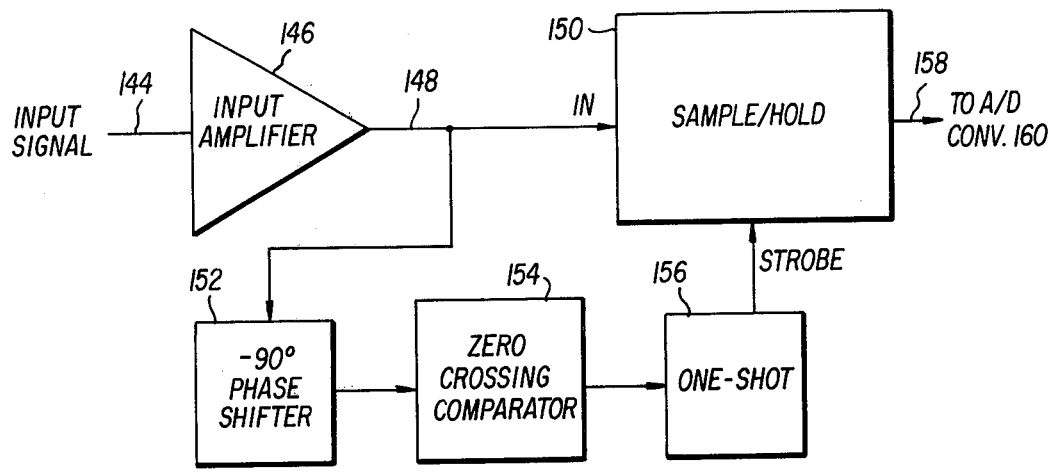
FIGS. 6a and 6b are respectively block and schematic diagrams of a circuit for sampling the sinusoidal chamber pressure signal once each cycle and for holding its output at the peak value of the pressure signal sinusoid.
Figure 6B:
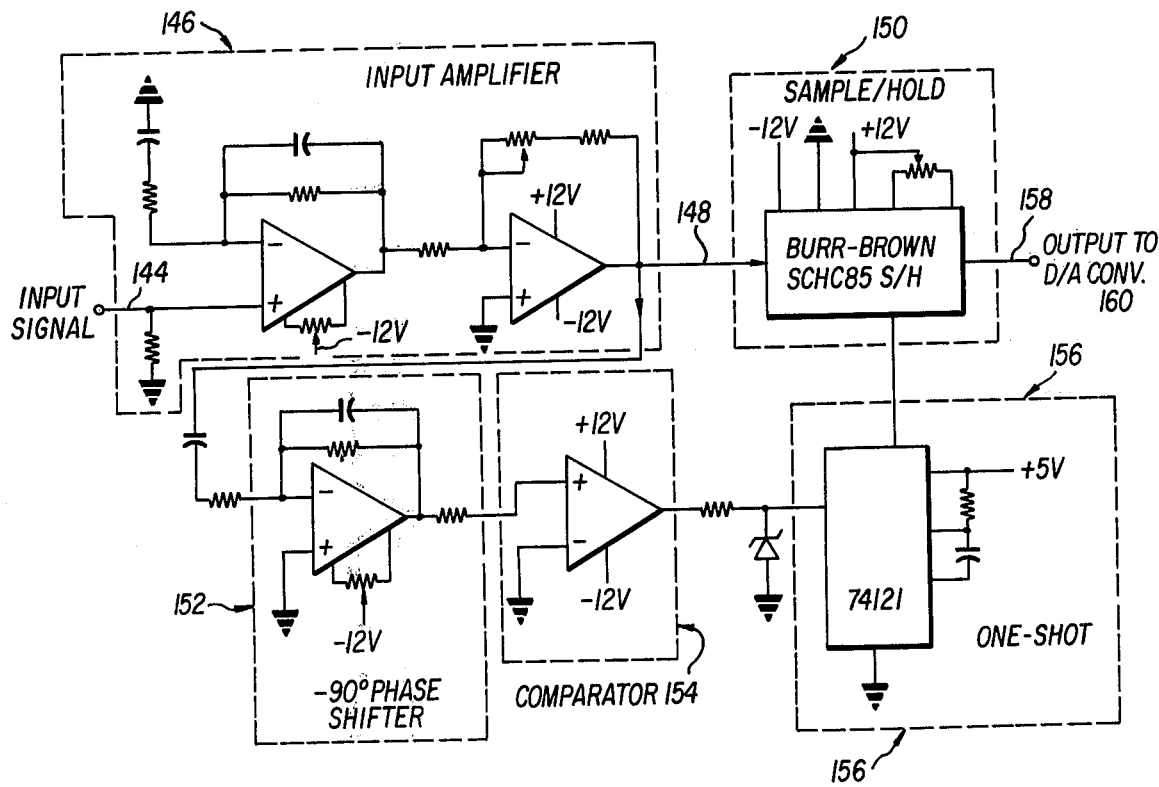

The computer-designed optimum horn section, for matching to a 304.8 cm (10-foot) cylindrical chamber 12 having a 30.4 cm (12-inch) diameter, is illustrated in FIGS. 4a and 4b. FIG. 4a shows a side view of the horn and FIG. 4b shows an end view of the horn. FIG. 4c shows a side view of the cylindrical chamber 12.

The aerosol feed input port 48 and exhaust port 90 for the chamber 12 are located at standing wave pressure nulls (nodes) in the chamber in order to reduce port losses. The exhaust port 90 is located one-quarter chamber wave-length from the end plate 16. The input port 48 has a specially designed tapered 3- by 1-inch feed nozzle which is located four $(n\lambda/2)$ wavelengths further down the length of the chamber. To minimize port losses, it is important that the controller 20 not allow the chamber to resonant at any of its nearly resonance frequencies, or the sound pressure minimums will not fall at the ports. This is a function the microcomputer controller 20 performs.

The sound source is a standard 100 watt compression driver 18 with a field replaceable voice coil (not shown). Since the agglomerator produces an SPL of 160 db with less than two (2) electrical watts of input power, the mean time before failure of the 100 watt driver should be long. The removable voice coil makes the system downtime for driver repair a matter of minutes.

As stated previously, the controller 20 is an adaptive electronic control system which incorporates a microcomputer. It monitors system outputs, it decides optimum combinations of control variables, and generates the signal (frequency and amplitude) for exciting the compression driver sound source 18. System sensor outputs (e.g., chamber pressures, flow rates, impedances, particle concentrations) are converted to digital signals, and then all system control functions are determined by digital calculations by the electronics disclosed in FIG. 2. The ability to time multiplex events allows the controller to base decisions on multiple sensor inputs and to control more than one system variable. Since the frequency of the sound signal in the chamber has a period of 650 to 770 microseconds and the time for executing microcomputer instructions is typically less than 5 microseconds, it is easily possible for the microcomputer to execute over a hundred step, multiple task program between cycles of the sound wave.

The signal generator 22, whose schematic is illustrated in FIG. 5, gives independent digital control of both frequency and amplitude. The output from signal generator 22 is a sinusoidal signal voltage which is amplified and used to generate the sound within the agglomeration chamber. The fact that signal amplitude and frequency are not interactive is extremely important because the microcomputer optimization search requires that the computer be able to examine the effects of changing each of them independently. Typically, the microcomputer control program will hold the amplitude constant and determine the optimum frequency for resonant enhancement within the chamber. Once the optimum frequency is determined, the computer can vary signal amplitude to produce a desired value of SPL in the chamber. As aerosol concentrations in the chamber vary, the required input signal power to maintain a critical SPL level in the chamber will vary. Power is conserved since the signal generator system (main source of power consumption by the chamber system) never puts out more power than is necessary to agglomerate the particulate. The amplitude control also allows the microcomputer controller 20 to shut off power altogether if it senses a failure of the compression driver 18, a failure of the power amplifier 64, or a zero-level particle concentration. In the case of a failure, the controller 20 generates a warning signal demanding repair.

In FIG. 5, the amplitude control signal appears on input 54 and the frequency control signal appears on input 56 to respective digital-to-analog converters 58 and 60. After conversion, the amplitude signal is switched through switch 130 and is adjusted by variable resistor $R_1$. After conversion by digital-to-analog converter 60, the signal inputs the negative side of amplifier 130 via resistor $R_2$. The point between the negative input to amplifier 130 and resistor $R_2$ is grounded via resistor $R_3$ and capacitor $C_1$. A variable resistor $R_4$ is connected between resistor $R_3$ and capacitor $C_1$. The variable resistor $R_4$ is grounded via resistor $R_5$. The positive side of amplifier 130 is grounded. A resistor $R_6$ is connected across the negative side of amplifier 130 and the output 132 from the amplifier 130.

The signal appearing on output 132 from amplifier 130 inputs voltage-controlled oscillator 134 wherein any change in the inputted signal causes a corresponding change in the output frequency from the voltage-controlled oscillator 134. The output 136 from oscillator 134 travels through capacitor $C_2$ before inputting multiplier 138. Output 136 and capacitor $C_2$ are grounded through resistor $R_7$.

The output 140 from multiplier 138 is indicative of the product of the magnitudes of the inputted amplitude and frequency values. This output signal inputs the negative side of amplifier 142 via variable resistor $R_8$ and resistor $R_9$. The positive side of amplifier 142 is grounded. Connected in parallel across the negative input and the output 62 of amplifier 142 are resistors $R_{10}$–$R_{11}$ and capacitor $C_3$. As seen in FIGS. 1 and 5, the output 62 is to power amplifier 64. From there, the signal goes to impedance monitor 68 and driver 18.

In FIG. 1, standard analog-to-digital converters and buffer amplifiers are used for converting the analog sensor signal to digital data for use by the microcomputer controller 20. FIGS. 6*a* and 6*b* show a circuit for sampling the sinusoidal chamber pressure signal once each cycle and for holding its output (to the A/D converter) at the peak value of the pressure signal sinusoid. Traditional signal strength sampling systems use rectifier-filter combinations to produce a DC output proportional to analog signal amplitude. The time constants typical of such filters are so long that rapid system transients cannot be tracked, and, in the case of a microcomputer controller the controller may have to wait an aritifically long time before making its next move in an optimization algorithm. The cycle-to-cycle peak sampler shown in FIGS. 6*a* and 6*b* is not so limited for it updates itself at a frequency equal to and in synchronization with the input signal. The components used in this application give it a 700 to 2,800 hertz range.

The circuit disclosed in FIGS. 6*a* and 6*b* could be attached to chamber 12 through a sensor (not shown) that would detect the pressure within the chamber. The input signal 144 would be amplified by amplifier 146 and the output 148 therefrom would go to sample and hold circuit 150. The output 148 also goes to phase shifter 152 wherein it is shifted 90 degrees. From phase shifter 152, the signal goes through zero crossing comparator 154 before inputting one-shot 156. The output from one-shot 156 is to sample and hold circuit 150. After the sampling and holding operation, an output 158 goes to analog-to-digital converter 160.

The microcomputer controller 20 generates system control signals to establish sound pressure levels within the agglomeration chamber at a minimum cost in energy. The controller can respond to measured SPLs in the chamber, aerosol flow rate, input particle concentrations, output particle concentrations, and the electrical impedance of the sound generator. Aerosol dwell time and sound generation considerations usually necessitate using chambers that have many resonance modes that are closely spaced in frequency. The controller 20 scans for the largest amplitude resonance mode and then uses an optimal search algorithm to find the point of peak resonance for the selected mode. The algorithm is optimal in the sense that it achieves maximum resonance in the fewest number of variable moves. Frequency can be maintained within 0.25 hertz of the optimum.

Since the agglomeration rate constant is proportional to the square root of SPL intensity, precise control of frequency is essential. Again, analog feedback, phase shifter dependent, voltage-controlled oscillator or analog resonant circuit signal generators are incapable of such control. The rapid rate of change of the acoustic chamber input impedance near resonance makes it extremely difficult for previously patented signal generator/control schemes to achieve maximum efficiency.

The agglomeration system in FIG. 1 has the ability to control all the major parameters which determine the agglomeration rate constant. The agglomeration rate constant, $K_a$, directly affects system power efficiency and the degree of fine particle removal. For a continuous flow "reactor" with an aerosol feed velocity, $V_x$, the concentration of fine particles at the exhaust from the chamber is given by:

$$n_o = n_i e^{-K_a t_d} = n_i e^{-K_a L/V_x}$$

where:
  $n_i$ = input fine particle concentration,
  $K_a$ = agglomeration rate constant,
  $t_d$ = average chamber dwell time,
  $L$ = length of the chamber.
The rate constant can be written as:

$$K_a = A\, n_{10} r_1^2\, \mu_{12} \sqrt{J}$$

where:
  A = constant related to the properties of the system and gas,
  $n_{10}$ = large particle (nuclei) concentration (particles/cm$^3$),
  $r_1$ = nuclei radius (cm),
  $\mu_{12}$ = relative velocity of fine and large particles,
  J = sound intensity (watts/cm$^2$).

Increasing $K_a t_d$ exponentially decreases the output fine particle concentration ($n_o$). The chamber design plus the computer control of sound frequency and amplitude allows the production of a sound intensity of at least 160 dB (necessary for good agglomeration) with a minimum input of electrical energy. By also having control of nuclei injection ($n_{10}$) and aerosol feed velocity ($t_D$), $K_a t_d$ can be adjusted to keep output fine particle concentrations below acceptable limits. The microcomputer controller can feed a small portion of the agglomerated output back into the chamber at a rate necessary to supply the nuclei for efficient agglomeration.

The ability of the controller 20 to vary the amplitude of the sound generator input conserves energy. When the input aerosol has a low particle concentration (as sensed by the input port optical transmission sensor), the sound generating signal amplitude and the nuclei injection rate can be adjusted so that just enough power is supplied to the chamber 12 to produce the desired output concentration. Since the controller simultaneously controls frequency to maximize resonant enhancement, the power consumption of the agglomeration system can be truly minimized.

Alternative uses of the disclosed invention involve processes which have not been adopted commercially because of the lack of an inexpensive method of attaining high sound intensity. These include: (1) heat recovery—metallurgical processes often produce high temperature gases. Heat from these gases can be recovered by use of conventional heat exchangers. Heat transfer coefficients to air have been doubled by high intensity sound. Increased heat exchange could result in more compact equipment for heat recovery; (2) isotope separation—gases have been separated according to molecular or atomic weight in both progressive and standing sound waves. This technique could be applied to such processes as the recovery of deuterium from hydrogen and to recovery of helium from natural gas; (3) acoustic drying—high intensity airborne sound is an effective method of drying difficult to dry materials. It has been applied in laboratory situations to spray drying in rotary dryers of the tumbler type and to spray drying of solutions. A major use of sonic drying is to remove water from the millions of tons of coal fines that are discarded due to difficulty of drying; (4) acoustic defoaming—high intensity sound is very effective in breaking foam. At intensities above 157 db destruction of the foam is almost instantaneous. A possible metallurgical application of acoustic foam breaking is froth flotation; and (5) improved combustion—high intensity sound has been observed to markedly increase combustion rates. An important area of application would be improved combustion of powdered coal.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A system for maintaining high resonance during sonic agglomeration of fine particulate entrained in an aerosol, comprising:
  an agglomeration chamber;
  an exponential horn acting as a source of sound for said agglomeration chamber; said exponential horn being located at one end of said agglomeration chamber;
  a sound reflecting plate for reflecting the sound waves produced by said exponential horn; said sound reflecting plate being located opposite said exponential horn at the other end of said agglomeration chamber;

a sound producing compression driver for driving said exponential horn to produce a desired sound pressure level within said agglomeration chamber;

particle means for producing particles of a greater diameter than said fine particulate to be agglomerated; said particles of a greater diameter being less responsive to the sound waves in said agglomeration chamber than said fine particulate to cause both the particles and said fine particulate to collide while being forced through said agglomeration chamber; said fine particulate and said particles of a greater diameter entering said agglomeration chamber through an inlet means located adjacent said exponential horn;

an adaptive control means operating in response to system variables to generate control signals based thereon to establish an effective sound pressure level within said agglomeration chamber and maintain a high degree of resonance;

a signal generator operating in response to said adaptive control means to provide an output signal to said sound producing compression driver, the frequency and the amplitude of said output signal being independently controlled; said adaptive control means holding said amplitude constant until the optimum frequency for resonant enhancement in said agglomeration chamber is determined, and thereafter said adaptive control means adjusting said amplitude to produce an effective sound pressure level in said agglomeration chamber;

an outlet means provided in said agglomeration chamber adjacent said sound reflecting plate; said outlet means and said inlet means being located at null points of the sound waves produced in said agglomeration chamber; and means for collecting the agglomerated particles which exit said agglomeration chamber through said outlet means.

2. A sonic agglomeration system as in claim 1 wherein the system variables are produced by sensor means for detecting the flow rate of said particulate through said agglomeration chamber, the mixing rate of said fine particulate and said particles of greater diameter, the concentration of the particulate, the level of the sound waves in said agglomeration chamber, the pressure of the agglomeration chamber and the electrical impedance of said sound producing compression driver.

3. A sonic agglomeration system as in claim 2 wherein said sound reflecting plate has a pressure sensor such as a microphone extending therethrough into said agglomeration chamber to detect and monitor the level of the sound waves produced in said agglomeration chamber.

4. A sonic agglomeration system as in claim 2 wherein at least one light source and at least one photodetector are located opposite each other within said agglomeration chamber to detect the concentration of said particulate within said agglomeration chamber.

5. A sonic agglomeration system as in claim 1 wherein the rate of agglomeration is proportional to the square root of the sound pressure level intensity.

6. A sonic agglomeration system as in claim 1 wherein said inlet means and said outlet means are located at said null points of the sound waves to minimize sound loss from said agglomeration chamber.

7. A sonic agglomeration system as in claim 1 wherein said collecting means is a cyclone which functions to separate the agglomerated particles from the aerosol.

8. A sonic agglomeration system as in claim 1 wherein changes in the concentration of fine paticulate within said agglomeration chamber create corresponding changes in sound pressure levels within said agglomeration chamber.

9. A sonic agglomeration system as in claim 8 wherein peak sound pressure levels are measured once each cycle of the detected signal.

10. A sonic agglomeration system as in claim 1 wherein said adaptive control means is a microcomputer.

11. A sonic agglomeration system as in claim 1 wherein said sound producing compression driver produces a sound pressure level of 160 db with less than two watts of power.

12. A sonic agglomeration system as in claim 1 wherein the acoustic impedance of said exponential horn equals the acoustic impedance of said agglomeration chamber.

* * * * *